United States Patent [19]
de Jong et al.

[11] Patent Number: 5,147,840
[45] Date of Patent: Sep. 15, 1992

[54] CATALYST COMPOSITIONS

[75] Inventors: Abe W. de Jong; Johannes J. Keijsper, both of Amsterdam, Netherlands

[73] Assignee: Shell Oil Company, Houston, Tex.

[21] Appl. No.: 767,702

[22] Filed: Sep. 30, 1991

[30] Foreign Application Priority Data

Oct. 12, 1990 [NL] Netherlands .......................... 9002223

[51] Int. Cl.$^5$ .............................................. B01J 31/04
[52] U.S. Cl. .................................... 502/167; 502/162; 528/392
[58] Field of Search ................................ 502/162, 167

[56] References Cited

U.S. PATENT DOCUMENTS

| | | | |
|---|---|---|---|
| 4,788,279 | 11/1988 | Drent | 502/162 X |
| 4,820,802 | 4/1989 | Drent et al. | 502/162 X |
| 4,859,764 | 8/1989 | Drent et al. | 502/167 X |
| 4,960,747 | 10/1990 | Van Doorn et al. | 502/167 |

FOREIGN PATENT DOCUMENTS 259914  8/1987  European Pat. Off. .

*Primary Examiner*—Patrick P. Garvin

[57] ABSTRACT

A novel catalyst composition containing a Group VIII metal and a phosphorus or nitrogen bidentate ligand catalyst and their use in the preparation of polymers of carbon monoxide with one or more mono-olefins.

17 Claims, No Drawings

CATALYST COMPOSITIONS

FIELD OF THE INVENTION

The invention relates to novel catalyst compositions which are suitable for use in the preparation of polymers of carbon monoxide with one or more olefinically unsaturated compounds.

BACKGROUND OF THE INVENTION

Linear polymers of carbon monoxide with one or more olefinically unsaturated aliphatic compounds, that comprise polymer units originating form carbon monoxide on the one hand and the polymer units originating from the olefinically unsaturated compounds on the other hand which occur in a substantially alternating arrangement. These linear polymers of CO and olefinically unsaturated compounds can be prepared by contacting the monomers at an elevated temperature and pressure with a catalyst composition containing a Group VIII metal and a phosphorus monodentate ligand with the general formula $(R_1)_3P$ or a phosphorus bidentate ligand with the general formula $(R_1)_2P-R-P(R_1)_2$ in which general formulae $R_1$ represents a monovalent hydrocarbon group and R is a hydrocarbon bridge group.

For some applications it may be desirable to have such linearly alternating polymers in which optionally substituted phenyl groups are present as side groups linked to the main chains. Attempts to prepare such polymers using the above-mentioned catalyst compositions starting from a monomer mixture that in addition to carbon monoxide contains one or more optionally substituted styrenes have hitherto been unsuccessful. Although these catalyst compositions are suitable for the preparation of linear alternating polymers of carbon monoxide with one or more olefinically unsaturated aliphatic compounds, they have been found to be unsuitable for the preparation of linear alternating polymers of carbon monoxide with one or more optionally substituted styrenes.

In the course of an investigation by the applicants into these alternating polymers it has now surprisingly been found that starting from monomer mixtures which besides carbon monoxide contain one or more optionally substituted styrenes, linear polymers can be prepared in which the units originating from carbon monoxide on the one hand and the units originating from the optionally substituted styrenes on the other hand occur in a substantially alternating arrangement, provided that in the above-mentioned catalyst compositions the phosphorus mono- or phosphorus bidentate ligand is replaced by a nitrogen bidentate ligand in which an $(R_1)N$ group is present, the nitrogen atom of which is linked exclusively via a non-aromatic double bond to a carbon atom of a hydrocarbon bridge group R and in which, moreover, either an $(R_2)N$ group is present, where the nitrogen atom of which is linked via a double bond to a carbon atom of the bridge group R, or an $(R_2)(R_3)N$ group, where the nitrogen atom of which is linked via a single bond to a carbon atom of the bridge group R, where $R_1$ in the aforesaid groups has the previously indicated meaning, and $R_2$ and $R_3$ are identical or different hydrocarbon groups, optionally corresponding with $R_1$. Catalyst compositions containing a Group VIII metal and a nitrogen bidentate ligand as described above are novel.

In the course of the applicants' research into these alternating polymers it has also been surprisingly found that suitable catalyst compositions for the preparation of linear polymers of carbon monoxide with one or more olefinically unsaturated aliphatic compounds can be obtained by incorporating as bidentate ligand in the aforesaid catalyst compositions a phosphorus bidentate ligand corresponding substantially as regards to structure with the above-described nitrogen bidentate ligand, but differing from it by both the nitrogen atoms being replaced by phosphorus atoms. Catalyst compositions containing a Group VIII metal and a phosphorus bidentate ligand of this kind are also novel.

In view of the favorable results obtained in the polymerization of carbon monoxide with one or more olefinically unsaturated aliphatic compounds using the novel catalyst compositions containing a phosphorus bidentate ligand, the applicants also tested catalyst compositions for the same purpose in which the phosphorus bidentate ligand was replaced by a phosphorus nitrogen bidentate ligand, and with regards to structure, the phosphorus nitrogen bidentate ligand corresponded substantially with the above-described phosphorus bidentate ligand, but differed from it by one of the phosphorus atoms being replaced by a nitrogen atom.; The results obtained in this part of the investigation were relatively disappointing. Although it was possible, starting from a mixture of carbon monoxide with one or more olefinically unsaturated aliphatic compounds, to obtain linear alternating polymers using these catalyst compositions containing a phosphorus nitrogen bidentate ligand, the activity of these catalyst compositions was far less than that of the novel catalyst compositions containing a phosphorus bidentate ligand.

SUMMARY OF THE INVENTION

The present patent application therefore relates to novel catalyst compositions containing a Group VIII metal and a phosphorus or nitrogen bidentate ligand in which an $(R_1)X$ group is present, the X atom of which is linked exclusively via a non-aromatic double bond to a carbon atom of a hydrocarbon bridge group R and in which, moreover, either an $(R_2)X$ group is present, the X atom of which is linked via a double bond to a carbon atom of the bridge group R, or an $(R_2)(R_3)X$ group, the X atom of which is linked via a single bond to a carbon atom of the bridge group R, where X represents a phosphorus or nitrogen atom, $R_1$ represents a monovalent hydrocarbon group and $R_2$ and $R_3$ are identical or different hydrocarbon groups, optionally corresponding with $R_1$.

The patent application further relates to the application of these catalyst compositions in the preparation of polymers of carbon monoxide with one or more olefinically unsaturated compounds, as well as to the polymers thus prepared and shaped objects consisting at least partly of these polymers.

Group VIII metals are understood in this patent application to be the noble metals ruthenium, rhodium, palladium, osmium, iridium and platinum, as well as the iron group metals iron cobalt and nickel.

DETAILED DESCRIPTION OF THE INVENTION

In the catalyst compositions of the invention, the Group VIII metal is preferably selected from palladium, nickel and cobalt. Palladium is particularly preferred as the Group VIII metal. The Group VIII metal is preferably incorporated in the catalyst compositions in the form of a salt of a carboxylic acid, and in particular in the form of an acetate. In addition to a Group VIII metal and a phosphorus or nitrogen bidentate ligand, the catalyst compositions of the invention also preferably contain an anion of an acid with a pKa of less than 4 and in particular an anion of an acid with a pKa of less than 2. Examples of acids with a pKa of less than 2 are mineral acids such as sulfuric acid and perchloric acid, sulfonic acids such as methanesulfonic acid, trifluoromethanesulfonic acid and para-toluenesulfonic acid, and halogen carboxylic acids such as trichloroacetic acid, difluoroacetic acid and trifluoroacetic acid. A sulfonic acid such as para-toluenesulfonic acid and a halogen carboxylic acid such as trifluoroacetic acid are preferred. The anion can be introduced into the catalyst compositions either in the form of a compound from which the desired anion splits off or in the form of a mixture of compounds form which the desired anion is formed by interaction. As a rule, the anion is incorporated in the catalyst compositions in the form of a n acid. If desired, the anion can also be incorporated in the catalyst compositions in the form of a main group metal salt or a non-noble transition metal salt of the corresponding acid. If an anion of a carboxylic acid is chosen, its incorporation in the catalyst compositions can be in the form of the acid or in the form of a derivative thereof, such as an alkyl or aryl ester, an amide, an imide, an anhydride, an ortho-ester, a lactone, a lactam or an alkylidene dicarboxylate. The anion is preferably present in the catalyst compositions in a quantity of 1-100 and in particular 2-50 mol per g.atom of Group VIII metal. Besides by application as a separate component, the anion of an acid with a pKa of less than 4 can also be present in the catalyst by the application of, for example, palladium trifluoroacetatae or palladium para-tosylate as a Group VIII metal compound.

Besides a Group VIII metal, a phosphorus or nitrogen bidentate ligand and, optionally, an anion of an acid with a pKa of less than 4, the catalyst compositions of the invention may also contain an organic oxidizing agent. Examples of suitable organic oxidizing agents are 1,2- and 1,4-quinones, aliphatic nitrites such as butyl nitrite, and aromatic nitro compounds such as nitrobenzene and 2,4-dinitrotoluene. 1,4-benzoquinone and 1,4-naphthoquinone are preferred. The quantity of organic oxidizing agent used preferably amounts to 5-5,000 and in particular 10-1,000 mol per g.atom Group VIII metal.

In the catalyst compositions of the invention, the phosphorus or nitrogen bidentate ligand is preferably present in a quantity of 0.5-200 and in particular 1-50 mol per g.atom Group VIII metal. In the phosphorus or nitrogen bidentate ligands used in the catalyst compositions of the invention, the hydrocarbon bridge group R preferably contains two or three carbon atoms in the bridge linking the two phosphorus or nitrogen atoms with each other.

Examples of nitrogen bidentate ligands in which each of the nitrogen atoms is linked via a non-aromatic double bond to a carbon atom of the hydrocarbon bridge group R are compounds with the general formula $(R_1)N=C(R_4)-C(R_5)=N(R_2)$ in which $R_1$ and $R_2$ represent identical or different monovalent hydrocarbon groups such as the tertiary butyl, cyclopropyl or isopropyl group and in which $R_4$ and $R_5$ represent identical or different monovalent hydrocarbon groups and/or hydrogen atoms. Favorable results were achieved with a catalyst composition according to the invention which contained a nitrogen bidentate ligand with the general formula $(R_1)N=C(R_4)-C(R_5)=N(R_2)$ in which $R_1$ and $R_2$ each represent a cyclohexyl group and $R_4$ and $R_5$ each represent a hydrogen atom.

Examples of nitrogen bidentate ligands in which one nitrogen atom is linked via a non-aromatic double bond to a carbon atom of the hydrocarbon bridge group R and in which the other nitrogen atom is linked via an aromatic double bond to a carbon atom of the hydrocarbon bridge group R are pyridine derivatives built up from a pyridine ring carrying an $(R_1)N=C(R_4)$-group as substituent in the 2-position and in which $R_1$ and $R_2$ have the previously indicated general meaning.

Examples of nitrogen bidentate ligands in which one nitrogen atom is linked via a non-aromatic double bond to a carbon atom of the hydrocarbon bridge group R, and in which the other nitrogen atom is linked via a single bond to a carbon atom of the hydrocarbon bridge group R compounds having the general formula $(R_1)N=C(R_4)-C(R_5)(R_6)-N(R_2)(R_3)$ in which $R_1$ to $R_5$ have the the previously indicated general meaning and $R_6$ represents a hydrocarbon group or hydrogen atom. A compound in which $R_1$ represents a tertiary butyl group, $R_2$ and $R_3$ are methyl groups and $R_4$ to $R_6$ represent hydrogen atoms is an example of a nitrogen bidentate ligand belonging to this class.

Examples of phosphorus bidentate ligands in which one phosphorus atom is linked via a non-aromatic double bond to a carbon atom of the hydrocarbon bridge group R, and in which the other phosphorus atom is linked via a single bond to a carbon atom of the hydrocarbon bridge group R are benzene derivatives consisting of a benzene ring carrying in the ortho positions relative to each other an $(R_1)P=C(R_4)$-group and an $(R_2)(R_3)P$-group as substituents. Favorable results were achieved with a catalyst composition according to the invention containing a phosphorus bidentate ligand of this kind in which $R_1$ represents a 2,4,6-tri(tert.butyl)-phenyl group, $R_4$ a hydrogen atom and $R_2$ and $R_3$ each a phenyl group.

The polymerization using the catalyst compositions of the invention is preferably carried out by contacting the monomers at elevated temperature and pressure with a solution of the catalyst composition in a diluent in which the polymers are insoluble or almost insoluble. As a diluent, lower alcohols such as methanol are very suitable. If desired, the polymerization can also be carried out in the gas phase, as olefinically unsaturated compounds that, with the aid of the catalyst compositions of the invention, can be polymerized with carbon monoxide. Compounds that consist exclusively of carbon and hydrogen as well as compounds which may in addition to carbon and hydrogen comprise of one or more hetero-atoms are also eligible for polymerization. Examples of the latter compounds are para-chlorostyrene, para-methoxystyrene and para-carboxystyrene. The catalyst compositions according to the invention are preferably applied for in the preparation of polymers of carbon monoxide with one or more olefinically unsaturated hydrocarbons. Examples of suitable hydrocarbon monomers are ethene and α-olefins such as propene, butene-1, hexene-1 and octene-1, styrene and alkyl-substituted styrenes such as para-methylstyrene and para-ethylstyrene, norbornene and dicyclopentadiene. The catalyst compositions of the invention which comprise a nitrogen bidentate ligand are in particular very suitable for use in the preparation of copolymers of carbon monoxide with styrene, while those containing a phosphorus bidentate ligand are preferably used for the preparation of copolymers of carbon monoxide with ethene and also for the preparation of terpolymers of carbon monoxide with ethene and with an α-olefin, in particular propene.

The quantity of catalyst composition used in the preparation of the polymers may vary within wide limits. Per mol of olefinically unsaturated compound to be polymerized with a quantity of catalyst composition is used that preferably contains $10^{-7}$ to $10^{-3}$ and in particular $10^{-6}$ to $10^{-4}$ g.atom Group VIII metal.

The preparation of the polymers is preferably carried out at a temperature of 25° to 150° C. and a pressure of 2 to 150 bar and in particular at a temperature of 30° to 130° C. and a pressure of 5 to 100 bar.

The ranges and limitations provided in the instant specification and claims ar those which are believed to particularly point out and distinctly claim the instant invention. It is, however, understood that other ranges and limitations that perform substantially the same function in substantially the same way to obtain substantially the same results are intended to be within the scope of the instant invention as defined by the instant specification and claims.

The invention will be described by the following examples which are provided for illustrative purposes and are not to be construed as limiting the invention.

Compound 1: A phosphorus nitrogen bidentate ligand consisting of a benzene ring carrying in the ortho positions relative to each other an $(R_1)P=C(R_4)$-group and a $(R_2)(R_3)N$-group as substituents, in which $R_1$ represents a 2,4,6-trimethylphenyl group, $R_4$ a phenyl group and $R_2$ and $R_3$ each a methyl group.

Compound 2: A phosphorus bidentate ligand consisting of a benzene ring carrying in the ortho positions relative to each other an $(R_1)P=C(R_4)$-group and an $(R_2)(R_3)P$-group as substituents, in which $R_1$ represents a 2,4,6-tri(tert.butyl)phenyl group, $R_4$ a hydrogen atom and $R_2$ and $R_3$ each a phenyl group.

Compound 3: A nitrogen bidentate ligand with the formula $(R_1)N=C(R_4)-C(R_5)=N(R_2)$ in which $R_1$ and $R_2$ each represent a cyclohexyl group and $R_4$ and $R_5$ each represent a hydrogen atom.

EXAMPLE 1

A carbon monoxide/ethene copolymer was prepared as follows. Into a stirred autoclave with a capacity of 300 ml which contained 120 ml methanol a catalyst solution was introduced consisting of:
10 ml acetone,
0.1 mmol palladium acetate,
0.4 mmol triphenyl phosphine, and
1.0 mmol trifluoroacetic acid.

After removal of the air form the autoclave, carbon monoxide was forced in until a pressure of 28 bar was reached and then ethene was forced in until a pressure of 60 bar was reached. The contents of the autoclave were then brought to 85° C. After 16 hours the polymerization was terminated by cooling to room temperature and releasing the pressure. The polymer was filtered off and washed with methanol and dried. 100 mg copolymer was obtained. The polymerization rate was 0.6 g copolymer/(g palladium.hour). cl EXAMPLE 2

A carbon monoxide/ethene copolymer was prepared in substantially the same way as in example 1, but with the following differences:

a) the catalyst solution contained 0.4 mmol compound 1 instead of triphenylphosphine, and
b) the reaction time was 17 hours instead of 16 hours.

2.2 g copolymer was obtained. The polymerization rate was 13 g copolymer/(g palladium.hour).

EXAMPLE 3

A carbon monoxide/ethene copolymer was prepared in substantially the same way as in example 1, but with the following differences:

a) the catalyst solution contained 0.4 mmol compound 2 instead of triphenylphosphine, and
b) the reaction time was 22 hours instead of 16 hours.

7 g copolymer was obtained. The polymerization rate was 32 g copolymer/(g palladium.hour).

EXAMPLE 4

A carbon monoxide/styrene copolymer was prepared as follows. Into a stirred autoclave with a capacity of 300 ml containing 100 ml styrene was introduced a catalyst solution consisting of:
20 ml methanol,
0.1 mmol palladium acetate,
2 mmol compound 3,
3 mmol para-toluenesulfonic acid, and
10 mmol 1,4-naphthoquinone.

After removal of the air form the autoclave, a 40 bar carbon monoxide was forced in. The temperature was then brought to 70° C. After 18 hours the polymerization was terminated by cooling to room temperature and releasing the pressure. The polymer was filtered off, and washed with methanol and dried. 3.2 g copolymer was obtained with a mean molecular weight, calculated as the numerical mean ($\overline{M}_n$), of 6000. The polymerization rate was 15 g copolymer/(g palladium.hour).

Of the examples 1-4, examples 3-4 are according to the invention. In these examples novel catalyst compositions according to the invention were used, which contained a phosphorus or nitrogen bidentate ligand. Examples 1 and 2 fall outside the scope of the invention. They are included in the patent application for comparison. In example 1, a catalyst composition was used which is known for the present purpose and which contained a phosphorus monodentate ligand. In example 2 catalyst composition was used which contained a phosphorus nitrogen bidentate ligand. The superiority of catalyst compositions according to the invention which contain a phosphorus bidentate ligand in comparison with catalyst compositions containing a closely related phosphorus nitrogen bidentate ligand is clearly evident form comparison of the results of examples 2 and 3, in which both catalyst compositions were tested under the same conditions for the polymerization of carbon monoxide with ethene.

It was established by $^{13}$C-NMR analysis that the polymers prepared according to examples 1-4 were built up from linear chains in which the units from carbon monoxide on the one hand and the units from ethene or styrene on the other hand occurred in an alternating arrangement.

What is claimed is:

1. A catalyst composition useful in the preparation of a polymer composition comprising:
A) a group VIII metal;
B) a phosphorus or a nitrogen bidentate ligand containing:

(i) an $(R_1)$ X group, wherein said said X atom is linked via a non-aromatic double bond to a carbon atom of a hydrocarbon bridge group R which forms the bridge between two X-containing groups and additionally containing:

(ii) a second X-containing group selected from (a) an $(R_2)$ X group wherein the X atom of which is linked via a double bond to a carbon atom of the hydrocarbon bridge group R, or (b) an $(R_2)(R_3)$ X group, wherein the X group of which is liked via a single bond to a carbon atom of the hydrocarbon bridge group R, wherein X in the aforesaid X-containing groups represents a phosphorus or nitrogen atom and wherein $R_1$ is a monovalent hydrocarbon group and $R_2$ and $R_3$ represent identical or different hydrocarbon groups which may be the same as the monovalent hydrocarbon group represented by $R_1$.

2. The catalyst composition according to claim 1, wherein the catalyst composition contains palladium as a Group VIII metal.

3. The catalyst composition according to claim 1, wherein the Group VIII metal is incorporated in the catalyst composition in the form of a salt of a carboxylic acid.

4. The catalyst composition according to claim 1, wherein the catalyst composition additionally comprises an anion of an acid with a pKa of less than 4.

5. The catalyst composition according to claim 4, wherein the anion of an acid has a pKa of less than 2.

6. The catalyst composition according to claim 4, wherein the anion of an acid is an anion of a sulfonic acid.

7. The catalyst composition according to claim 4, wherein the anion of an acid is an anion of a halogencarboxylic acid.

8. The catalyst composition according to claim 1, wherein the catalyst composition additionally comprises an organic oxidizing agent.

9. The catalyst composition according to claim 8, wherein the organic oxidizing agent is a 1,4-quinone.

10. The catalyst composition according to claim 8, wherein the organic oxidizing agent is a 1,4-naphthoquinone and/or a 1,4-benzoquinone.

11. The catalyst composition according to claim 9, wherein the catalyst composition contains the organic oxidizing agent in a quantity of 5-5000 mol per g. atom Group VIII metal.

12. The catalyst composition according to claim 1, wherein the catalyst composition contains the phosphorus or nitrogen bidentate ligand in a quantity of 0.5-200 mol per g. atom Group VIII metal.

13. The catalyst composition according to claim 1, wherein the catalyst composition contains a phosphorous or nitrogen bidentate ligand in which the hydrocarbon bridge group R contains two or three carbon atoms in the bridge linking the two phosphorus or nitrogen atoms with each other.

14. The catalyst composition according to claim 1, wherein the catalyst composition contains a nitrogen bidentate ligand with the general formula $(R_1)N=C(R_4)-C(R_5)=N(R_2)$ in which $R_4$ and $R_5$ represent identical or different monovalent hydrocarbon groups and/or hydrogen atoms.

15. The catalyst composition according to claim 14, wherein the catalyst composition contains a nitrogen bidentate ligand in which $R_1$ and $R_2$ each represent a cyclohexyl group and $R_4$ and $R_5$ each represent a hydrogen atoms.

16. The catalyst composition according to claim 1, wherein the catalyst composition contains a phosphorus bidentate ligand consisting of a benzene ring carrying in the ortho positions relative to each other an $(R_1)P=C(R_4)$-group and a $(R_2)(R_3)$-group as substituents, in which $R_4$ represents a monovalent hydrocarbon group or a hydrogen atom.

17. The catalyst composition according to claim 16, wherein the catalyst composition contains a phosphorus bidentate ligand in which $R_1$ represents a 2,4,6-tri (tert. butyl) phenol group, $R_4$ a hydrogen atom and $R_2$ and $R_3$ each a phenyl group.

* * * * *